(12) United States Patent
Laubender et al.

(10) Patent No.: US 9,233,353 B2
(45) Date of Patent: Jan. 12, 2016

(54) CARRIER SYSTEM FOR FRAGRANCES

(75) Inventors: Matthias Laubender, Schifferstadt (DE); Ouidad Benlahmar, Mannheim (DE); Roland Ettl, Altuβheim (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/264,895

(22) PCT Filed: Apr. 13, 2010

(86) PCT No.: PCT/EP2010/054791
§ 371 (c)(1),
(2), (4) Date: Oct. 17, 2011

(87) PCT Pub. No.: WO2010/119020
PCT Pub. Date: Oct. 21, 2010

(65) Prior Publication Data
US 2012/0058929 A1  Mar. 8, 2012

(30) Foreign Application Priority Data
Apr. 17, 2009  (EP) ..................................... 09158186

(51) Int. Cl.
*C11D 3/50* (2006.01)
*B01J 13/14* (2006.01)

(52) U.S. Cl.
CPC  *B01J 13/14* (2013.01); *C11D 3/505* (2013.01)

(58) Field of Classification Search
CPC ..................................................... C11D 3/505
See application file for complete search history.

(56) References Cited

U.S. PATENT DOCUMENTS

| | | |
|---|---|---|
| 5,089,162 A | 2/1992 | Rapisarda et al. |
| 6,143,707 A | 11/2000 | Trinh et al. |
| 2003/0125222 A1 | 7/2003 | Jahns et al. |
| 2005/0003980 A1* | 1/2005 | Baker et al. .................... 510/276 |
| 2009/0256107 A1 | 10/2009 | Hentze et al. |
| 2009/0289216 A1 | 11/2009 | Jung et al. |
| 2010/0068525 A1 | 3/2010 | Jung et al. |
| 2010/0286018 A1 | 11/2010 | Hentze et al. |

FOREIGN PATENT DOCUMENTS

| | | |
|---|---|---|
| CA | 2041792 | 11/1991 |
| DE | 10209222 | 9/2003 |
| EP | 0457154 | 11/1991 |
| EP | 1360270 | 11/2003 |
| EP | 1797946 | 6/2007 |
| EP | 2 237 874 B1 | 10/2010 |
| FR | 2774390 | 8/1999 |
| JP | H04-227845 A | 8/1992 |
| JP | 2003-524689 A | 8/2003 |
| JP | 2006-257415 A | 9/2006 |
| WO | WO-01/49817 | 7/2001 |
| WO | WO-2005/105291 | 11/2005 |
| WO | WO-2008/006762 A2 | 1/2008 |
| WO | WO-2008/046839 A1 | 4/2008 |
| WO | WO-2008/058868 | 5/2008 |
| WO | WO-2008/064999 A2 | 6/2008 |
| WO | WO-2008/071649 A2 | 6/2008 |
| WO | WO-2008/151941 A1 | 12/2008 |
| WO | WO-2009/027957 | 3/2009 |
| WO | WO-2009/090169 A1 | 7/2009 |

OTHER PUBLICATIONS

Arctander, Steffen, "Perfume and Flavor Chemicals", published by the author, Montclair, NJ., 1969, essay 2288.*
Translation of the International Preliminary Report on Patentability for PCT//EP2010/054791 dated Oct. 18, 2011.

\* cited by examiner

*Primary Examiner* — John Hardee
(74) *Attorney, Agent, or Firm* — Drinker Biddle & Reath LLP

(57) ABSTRACT

The present invention relates to a carrier system for fragrances, to the production thereof and to the use of the carrier system in various fields of industry.

17 Claims, No Drawings

CARRIER SYSTEM FOR FRAGRANCES

CROSS-REFERENCE TO RELATED APPLICATIONS

This application is a national stage application (under 35 U.S.C. §371) of PCT/EP2010/054791, filed Apr. 13, 2010, which claims benefit of EP 09158186.8, filed Apr. 17, 2009.

BACKGROUND OF THE INVENTION

The present invention relates to a carrier system for fragrances, to the production thereof and to the use of the carrier system in various fields of industry.

For protection of valuable chemical compounds such as dyes, medicaments and crop protection compositions, enzymes, but also fragrances or odorants, during storage before intended use, the use of microcapsules is increasingly being considered or is already being practiced. These microcapsules enable the valuable active ingredient to be provided already distributed relatively homogeneously in a use mixture, without having to expose it to the other constituents during storage. Suitable selection of the shell of the capsule also allows effects included retarded release to be achieved in this way.

For example, EP 0 457 154 describes a shell of polymer, more specifically of 30 to 100% by mass of alkyl ester of acrylic acid or methacrylic acid and 0 to 80% by mass of a bi- or polyfunctional monomer, and also 0 to 40% by mass of other vinylic monomers, for encapsulation of color carriers. These color carriers are notable for low volatility.

WO 05/105291 discloses a shell of polymer composed of 5 to 90% by mass of water-soluble monomers such as acrylic acid or methacrylic acid, 5 to 90% by mass of a bi- or polyfunctional monomer and 0 to 55% by mass of low water solubility monomers such as alkyl esters of acrylic acid or methacrylic acid. It serves for encapsulation of paraffins, i.e. likewise of nonvolatile substances, for coating of textiles directly in the spinning process.

WO 08/058,868 too, which discloses a shell of a polymer composed of 1 to 95% by mass of water-soluble monomers such as acrylic acid or methacrylic acid, 5 to 99% by mass of a bi- or polyfunctional monomer and 0 to 60% by mass of low water solubility monomers such as alkyl esters of acrylic acid or methacrylic acid, serves to enclose a nonvolatile substance, namely a paraffin.

For use of microcapsules for preserving volatile chemical compounds, which include, for example, many fragrances or odorants, for applications in washing and cleaning compositions and for laundry and surface treatment, the capsules must enclose the volatile substance particularly efficiently. It was therefore an object of the present invention to provide a microcapsule with improved imperviosity for volatile substances.

The object is surprisingly achieved by the microcapsules according to claims 1 to 7; a chemical composition comprising them according to claims 8 and 9, and also the uses according to claims 10 to 13 and the articles comprising microparticles according to claims 14 and 15 form further constituent parts of the present invention.

DETAILED DESCRIPTION OF THE INVENTION

Accordingly, the object is achieved by a microcapsule comprising a core a) which comprises a fragrance or odorant, and a shell b), b) being obtainable by polymerizing one or more $C_1$-$C_{24}$-alkyl ester(s) of acrylic acid and/or methacrylic acid and MAA, the MAA being present in the shell in an amount of 20 to 60% by mass, and/or BDA2 in an amount of 10 to 50% by mass and/or
PETIA in an amount of 10 to 50% by mass and/or
EDGMA in an amount of 10 to 50% by mass, where the (total) amount of BDA2, PETIA and EDGMA present in the shell in copolymerized form is at least 30% by mass.

The abbreviations mean:
MMA methyl methacrylate
MAA methacrylic acid
BDA2 1,4-butanediol diacrylate
PETIA pentaerythrityl triacrylate
EDGMA ethylene glycol dimethacrylate
DMAEMA dimethylaminoethyl methacrylate.

A fragrance or odorant is understood to mean all organic substances which have a desired olfactory property and are essentially nontoxic. They include all fragrances or odorants used customarily in washing or cleaning compositions or in perfumery. They may be compounds of natural, semisynthetic or synthetic origin. Preferred fragrances or odorants can be assigned to the substance classes of the hydrocarbons, aldehydes or esters. The fragrances or odorants also include natural extracts and/or essences which may comprise complex mixtures of constituents, such as orange oil, lemon oil, rose extract, lavender, musk, patchouli, balsam essence, sandalwood oil, pine oil and cedar oil.

Nonlimiting examples of synthetic and semisynthetic fragrances or odorants are: 7-acetyl-1,2,3,4,5,6,7,8-octahydro-1,1,6,7-tetramethylnaphthalene, α-ionone, β-ionone, γ-ionone, α-isomethylionone, methyl cedryl ketone, methyl dihydrojasmonate, methyl 1,6,10-trimethyl-2,5,9-cyclododecatrien-1-yl ketone, 7-acetyl-1,1,3,4,4,6-hexamethyltetralin, 4-acetyl-6-tert-butyl-1,1-dimethylindane, hydroxyphenylbutanone, benzophenone, methyl β-naphthyl ketone, 6-acetyl-1,1,2,3,3,5-hexamethylindane, 5-acetyl-3-isopropyl-1,1,2,6-tetramethylindane, 1-dodecanal, 4-(4-hydroxy-4-methylpentyl)-3-cyclohexene-1-carboxaldehyde, 7-hydroxy-3,7-dimethyloctanal, 10-undecen-1-al, isohexenylcyclohexylcarboxaldehyde, formyltricyclodecane, condensation products of hydroxycitronellal and methyl anthranilate, condensation products of hydroxycitronellal and indole, condensation products of phenylacetaldehyde and indole, 2-methyl-3-(para-tert-butylphenyl) propionaldehyde, ethylvanillin, heliotropin, hexylcinnamaldehyde, amylcinnamaldehyde, 2-methyl-2-(isopropylphenyl)propionaldehyde, coumarin, decalactone-γ, cyclopentadecanolide, 16-hydroxy-9-hexadecenolactone, 1,3,4,6,7,8-hexahydro-4,6,6,7,8,8-hexamethylcyclopenta-γ-2-benzopyran, β-naphthol methyl ether, ambroxan, dodecahydro-3a,6,6,9a-tetramethylnaphtho[2,1b]furan, cedrol, 5-(2,2,3-trimethylcyclopent-3-enyl)-3-methylpentan-2-ol, 2-ethyl-4-(2,2,3-trimethyl-3-cyclopenten-1-yl)-2-buten-1-ol, caryophyllene alcohol, tricyclodecenyl propionate, tricyclodecenyl acetate, benzyl salicylate, cedryl acetate and tert-butylcyclohexyl acetate.

Further examples of fragrances or odorants usable in accordance with the invention are described, for example, in U.S. Pat. No. 6,143,707, U.S. Pat. No. 5,089,162, EP 1 360 270 and WO 2009/027957.

Particular preference is given to: hexylcinnamaldehyde, 2-methyl-3-(tert-butylphenyl)propionaldehyde, 7-acetyl-1, 2,3,4,5,6,7,8-octahydro-1,1,6,7-tetramethylnaphthalene, benzyl salicylate, 7-acetyl-1,1,3,4,4,6-hexamethyltetralin, para-tert-butyl-cyclohexyl acetate, methyl dihydrojasmonate, β-naphthol methyl ether, methyl β-naphthyl ketone, 2-methyl-2-(para-isopropylphenyl)propionaldehyde, 1,3,4,6,7,8-hexahydro-4,6,6,7,8,8-hexamethylcyclpenta-γ-2-benzopyran, dodecahydro-3a,6,6,9a-tetramethylnaphtho[2,1b]furan, anisaldehyde, coumarin, cedrol, vanillin, cyclopentadecanolide, tricyclodecenyl acetate and tricyclodecenyl propionate.

Other fragrances are essential oils, resinoids and resins from a multitude of sources, such as peru balsam, olibanum resinoid, styrax, labdanum resin, nutmeg, cassia oil, benzoin resin, coriander and lavandin. Further suitable fragrances are: phenyl ethyl alcohol, terpineol, linalool, linalyl acetate, geraniol, nerol, 2-(1,1-dimethylethyl)cyclohexanol acetate, benzyl acetate and eugenol.

The fragrances or odorants can be used as pure substances or in a mixture with one another. The fragrance or odorant can form the core of the microcapsules as the sole hydrophobic material. Alternatively, the microcapsules may comprise a further hydrophobic material in addition to the fragrance or odorant, in which the fragrance or odorant is dissolved or dispersed. For example, in the case of use of fragrances or odorants which are solid at room temperature, the use of a hydrophobic material which is liquid at room temperature as solvent or dispersant is advantageous.

It is equally possible to increase the hydrophobicity of a fragrance or odorant by adding a further hydrophobic material to this fragrance or odorant.

Preferably, the fragrance or odorant or the mixture of fragrances or odorants makes up 1 to 100% by mass, preferably 20 to 100% by mass, of the hydrophobic core material.

The hydrophobic material is liquid at temperatures below 100° C., preferably at temperatures below 60° C. and more preferably at room temperature.

C1-C24-alkyl ester(s) of acrylic acid and/or methacrylic acid are generally understood to mean not just the pure alkyl esters, but also modified compounds, such as alkylamides of acrylic acid or vinyl alkyl ethers. Nonexclusive examples are: tert-butylacrylamide and acrylamide.

It will be appreciated that preferred embodiments exist; for instance, preference is given to a microcapsule in which the shell comprises, in copolymerized form, a $C_1$-$C_{24}$-alkyl ester of acrylic acid and/or methacrylic acid and
MAA in an amount of 25 to 50% by mass and/or
BDA2 in an amount of 20 to 40% by mass and/or
PETIA in an amount of 20 to 40% by mass and/or
EDGMA in an amount of 20 to 40% by mass.

Even more preferred is a microcapsule, in which the $C_1$-$C_{24}$-alkyl ester of acrylic acid and/or methacrylic acid is methyl methacrylate and
MAA is copolymerized into the shell in an amount of 35 to 45% by mass and/or
BDA2 in an amount of 25 to 35% by mass and/or
PETIA in an amount of 25 to 35% by mass and/or
EDGMA in an amount of 25 to 35% by mass.

The inventive microcapsules have the advantage of protecting volatile substances from evaporation efficiently.

The present invention therefore further provides a microcapsule comprising a core a), which comprises a fragrance or odorant, and a shell b), b) being obtainable by polymerizing one or more $C_1$-$C_{24}$-alkyl ester(s) of acrylic acid and/or methacrylic acid and the microcapsule having an evaporation rate, measured by the "evaporation rate test", of less than 10% by mass.

In the "evaporation rate test", the weight of a dry sample (approx. 1 g) is first determined at room temperature. The sample is then heat treated at 130° C. for one hour. Subsequently, it is weighed again at room temperature. The loss of mass thus determined in relation to the total mass of the dry sample multiplied by 100 gives the evaporation rate, which is reported in %.

For the measurement, the amount of sample used is large enough to arrive at loss of mass results outside the error limits of the balance at least by a factor of 10 with the weight used. The amount of sample used should also be selected such that the mass of the sample is greater than that of the vessel in which the sample is placed into the oven; the specific heat capacity of the vessel should be <1000 J/(kg·K); this can be achieved, for example, by using an aluminum dish. The weight of the aluminum dish is typically approx. 1 to 2 g.

When the sample is not already dry, 1.5 to 2.0 g of dispersion, for example as obtained in the production, is first dried at 105° C. over 2 h, in order to remove the water. Then the weight of the dried sample is determined as described above.

Accordingly, particular preference is given to a microcapsule as described above, said microcapsule having an evaporation rate measured by the "evaporation rate test" of less than 10% by mass.

Such microcapsules are obtainable by polymerizing the monomer or monomer mixture which forms the shell in the oil phase of a stable oil-in-water emulsion, where the oil phase consists of a hydrophobic material. Before the start of the polymerization, a mixture of monomers and hydrophobic phase which comprises at least one fragrance or odorant must be present. This preparation process is known per se and is described, for example, in EP-A-0 457 154.

The hydrophobic materials which can be used for the oil phase include all kinds of oils, such as vegetable oils, animal oils, mineral oils, paraffins, chloroparaffins, fluorohydrocarbons and other synthetic oils.

Typical and nonlimiting examples are sunflower oil, rapeseed oil, olive oil, peanut oil, soybean oil, kerosene, benzene, toluene, butane, pentane, hexane, cyclohexane, chloroform, carbon tetrachloride, chlorinated diphenyls and silicone oil. It is also possible to use hydrophobic materials with a high boiling point, e.g. diethyl phthalate, dibutyl phthalate, diisohexyl phthalate, dioctyl phthalate, alkylnaphthalene, dodecylbenzene, terphenyl, partly hydrogenated terphenyls, Ethylhexyl Palmitate, Capric/Caprylic-Triglyceride, PPG-2 Myristyl Ether Propionate; PPG-5 Ceteth-20; $C_{12-15}$ Alkyl Benzoate, Mineral Oil (CAS: 8042-47-5); Cetearyl Ethylhexanoate; Dimethicone; Polyisobutylene (e.g. BASF: Glisopal®, Oppanol®).

The hydrophobic material optionally comprising the fragrance or odorant or consisting thereof is selected such that it can be emulsified in water at temperatures between its melting point and the boiling point of water. Low viscosity hydrophobic materials have a Brookfield viscosity of <5 Pa*s (measured at 23° C. with spindle 5 at 20 rev./s to DIN EBN ISO 3219).

The core of the microcapsules is formed by a hydrophobic material emulsifiable in water. The hydrophobic material serves simultaneously as a solvent or dispersant for the monomer mixture used in the preparation of the capsule shell by polymerization.

The polymerization then takes place in the oil phase of a stable oil-in-water emulsion. This emulsion is obtained by, for example, first dissolving the monomers and a polymerization initiator and optionally a polymerization regulator in the hydrophobic material and emulsifying the solution thus obtained in an aqueous medium with an emulsifier and/or protective colloid. However, it is also possible first to emulsify the hydrophobic phase or constituents thereof in the aqueous phase and then to add to the emulsion the monomers or the polymerization initiator and any assistants still to be used, such as protective colloids or polymerization regulators.

In another process variant, it is also possible to emulsify the hydrophobic material and the monomers in water and then to add only the polymerization initiator. Since the hydrophobic material should be very substantially microencapsulated in the emulsion, it is possible with preference to use only those hydrophobic materials whose solubility in water is limited. The solubility should preferably not exceed 5% by weight. For complete encapsulation of the hydrophobic material in the oil phase of the oil-in-water emulsion, it is appropriate to select the monomers according to their solubility in the hydrophobic material. While the monomers are essentially soluble in the oil, they form, in the course of polymerization, in the individual oil droplets, oligo- and polymers which are soluble neither in the oil phase nor in the water phase of the oil-in-water emulsion and migrate to the interface between the oil droplets and the water phase. In the course of further polymerization, the form the wall material there, which finally encloses the hydrophobic material as the core of the microcapsules.

To form a stable oil-in-water emulsion, protective colloids and/or emulsifiers are generally used. Suitable protective colloids are, for example, cellulose derivatives such as hydroxyethylcellulose, carboxymethylcellulose and methylcellulose, polyvinylpyrrolidone and copolymers of N-vinylpyrrolidone, polyvinyl alcohols and partially hydrolyzed polyvinyl acetates. Particular preference is given to the polyvinyl alcohols. In addition, it is also possible to use gelatin, gum arabic, xanthan gum, alginates, pectins, degraded starches and casein. Ionic protective colloids may also find use. The ionic protective colloids used may be polyacrylic acid, polymethacrylic acid, copolymers of acrylic acid and methacrylic acid, sulfo-containing water-soluble polymers with a content of sulfoethyl acrylate, sulfoethyl methacrylate or sulfopropyl methacrylate, and polymers of N-(sulfoethyl)maleimide, 2-acrylamido-2-alkylsulfonic acids, styrenesulfonic acids and formaldehyde, and also condensates of phenolsulfonic acids and formaldehyde. The protective colloids are generally added in amounts of 0.1 to 10% by mass, based on the water phase of the emulsion. The polymers used as ionic protective colloids preferably have mean molar masses $M_w$ of 500 to 1 000 000 g/mol, preferably 1000 to 500 000 g/mol.

The polymerization is generally effected in the presence of polymerization initiators which form free radicals. For this purpose, it is possible to use all customary peroxo and azo compounds in the amounts customarily used, for example from 0.1 to 5% by mass, based on the mass of the monomers to be polymerized. Preference is given to those polymerization initiators which are soluble in the oil phase or in the monomers. Examples thereof are t-butyl peroxyneodecanoate, t-butyl peroxypivalate, t-amyl peroxypivalate, dilauroyl peroxide, t-amyl peroxy-2-ethylhexanoate and the like.

The polymerization of the oil-in-water emulsion is performed typically at 20 to 100° C., preferably at 40 to 90° C. Typically, the polymerization is undertaken at standard pressure, but can also be effected at elevated or reduced pressure, for example in the range from 0.5 to 20 bar. The procedure is appropriately to emulsify a mixture of water, protective colloid and/or emulsifiers, hydrophobic materials, polymerization initiators and monomers with a high-speed disperser to the desired droplet size of the hydrophobic material, and to heat the stable emulsion taking account of the decomposition temperature of the polymerization initiator. The rate of polymerization can be controlled in a known manner through the selection of the temperature and of the amount of polymerization initiator. On attainment of the polymerization temperature, the polymerization is appropriately continued for a further period, for example 2 to 6 hours, in order to complete the conversion of the monomers.

Particular preference is given to a mode of operation in which, during the polymerization, the temperature of the polymerizing reaction mixture is varied continuously or periodically, for example increased continuously or periodically. This is done, for example, with the aid of a program with rising temperature.

For this purpose, the total polymerization time can be divided into two or more periods. The first polymerization period is characterized by a slow decomposition of the polymerization initiator. In the second polymerization period and any further polymerization periods, the temperature of the reaction mixture is increased, in order to accelerate the decomposition of the polymerization initiators. The temperature can be increased in one step or in two or more steps, or continuously in a linear or nonlinear manner. The temperature difference between the start and the end of the polymerization may be up to 50° C. In general, this difference is 3 to 40° C., preferably 3 to 30° C.

The microcapsule dispersions obtained by one of the procedures outlined above can subsequently be spray dried in a customary manner. To facilitate the redispersion of the spray dried microcapsules, additional amounts of emulsifier and/or protective colloid can optionally be added to the dispersions before the spray drying. Suitable emulsifiers and protective colloids are those specified above in connection with the production of the microcapsule dispersions. In general, the aqueous microcapsule dispersion is atomized in a hot air stream which is conducted in cocurrent or countercurrent, preferably in cocurrent, with the spray mist. The inlet temperature of the hot air stream is typically in the range from 100 to 200° C., preferably 120 to 160° C., and the outlet temperature of the air stream is generally in the range from 30 to 90° C., preferably 60 to 80° C. The aqueous microcapsule dispersion can be sprayed, for example, by means of one-substance or multisubstance nozzles, or by means of a rotating disk.

The spray dried microcapsules are normally deposited using cyclones or filter separators.

The microcapsules thus obtainable preferably have a mean diameter in the range from 1 to 100 μm, more preferably from 1 to 50 μm and most preferably from 1 to 30 μm.

Owing to the intended use, a preferred range also arises for the ratio of the thickness of the shell to the diameter of the capsule. Thus, preference is given to a microcapsule in which the ratio of the thickness of the shell to the diameter of the microcapsule is in the range from 0.0005 to 0.2, more preferably in the range from 0.005 to 0.08 and most preferably from 0.015 to 0.055.

The present invention further provides a chemical composition comprising microcapsules as described above. For instance, the liquid microcapsule formulations or spray dried microcapsules can be used especially for formulation of washing or cleaning compositions. However, they can also be used for formulation of, for example, adhesives, paints, cosmetics, deodorants, repellents and dispersions.

Particular preference is given to a chemical composition comprising at least one substance selected from the group consisting of surfactants, disinfectants, dyes, acids, bases, complexing agents, biocides, hydrotropes, thickeners, builders, cobuilders, enzymes, bleaches, bleach activators, corrosion inhibitors, bleach catalysts, color protection additives, dye transfer inhibitors, graying inhibitors, soil release polymers, fiber protection additives, silicones, bactericides and preservatives, organic solvents, solubilizers, dissolution improvers and perfume.

Surfactants generally consist of a hydrophobic moiety and of a hydrophilic moiety. The hydrophobic moiety generally has a chain length of 4 to 20 carbon atoms, preferably 6 to 19 carbon atoms and more preferably 8 to 18 carbon atoms. The functional unit of the hydrophobic group is generally an OH group, in which case the alcohol may be branched or unbranched. The hydrophilic moiety generally consists essentially of alkoxylated units (e.g. ethylene oxide (EO), propylene oxide (PO) and/or butylene oxide (BO)), in which case typically 2 to 30, preferably 5 to 20, of these alkoxylated units are present in series, and/or charged units such as sulfate, sulfonate, phosphate, carboxylic acids, ammonium and ammonium oxide.

Examples of anionic surfactants are: carboxylates, sulfonates, sulfo fatty acid methyl esters, sulfates, phosphates. Examples of cationic surfactants are: quaternary ammonium compounds. Examples of betaine surfactants are: alkyl betaines. Examples of nonionic compounds are: alcohol alkoxylates.

A "carboxylate" is understood to mean a compound which has at least one carboxylate group in the molecule. Examples of carboxylates which can be used in accordance with the invention are soaps—e.g. stearates, oleates, cocoates of the alkali metals or of ammonium, ether carboxylates—e.g. Akypo® RO 20, Akypo® RO 50, Akypo® RO 90.

A "sulfonate" is understood to mean a compound which has at least one sulfonate group in the molecule. Examples of sulfonates which can be used in accordance with the invention are alkylbenzenesulfonates—e.g. Lutensit® A-LBS, Lutensit® A-LBN, Lutensit® A-LBA, Marlon® AS3, Maranil® DBS, alkylsulfonates—e.g. Alscoap OS-14P, BIO-TERGE® AS-40, BIO-TERGE® AS-40 CG, BIO-TERGE® AS-90 Beads, Calimulse® AOS-20, Calimulse® AOS-40, Calsoft® AOS-40, Colonial® AOS-40, Elfan® OS 46, Ifrapon® AOS 38, Ifrapon® AOS 38 P, Jeenate® AOS-40, Nikkol® OS-14, Norfox® ALPHA XL, POLYSTEP® A-18, Rhodacal® A-246L, Rhodacal® LSS-40/A, sulfonated oils, for example Turkey red oil, olefinsulfonates, aromatic sulfonates—e.g. Nekal® BX, Dowfax® 2A1.

A "sulfo fatty acid methyl ester" is understood to mean a compound which has the following unit of the general formula (I):

$$\text{R}-\underset{\underset{\text{O}}{\|}}{\text{C}}(\text{SO}_3\text{Na})-\text{OMe} \quad (I)$$

in which R has 10 to 20 carbon atoms; R preferably has 12 to 18 and more preferably 14 to 16 carbon atoms.

A "sulfate" is understood to mean a compound which has at least one $SO_4$ group in the molecule. Examples of sulfates which can be used in accordance with the invention are fatty alcohol sulfates, for example coconut fatty alcohol sulfate (CAS 97375-27-4)—e.g. EMAL® 10G, Dispersogen® SI, Elfan® 280, Mackol® 100N, other alcohol sulfates—e.g. Emal® 71, Lanette® E, coconut fatty alcohol ether sulfate—e.g. Emal® 20C, Latemul® E150, Sulfochem® ES-7, Texapon® ASV-70 Spec., Agnique SLES-229-F, Octosol 828, POLYSTEP® B-23, Unipol® 125-E, 130-E, Unipol® ES-40, other alcohol ether sulfates—e.g. Avanel® S-150, Avanel® S150 CG, Avanel® S150 CG N, Witcolate® D51-51, Witcolate® D51-53.

In the present context, a "phosphate" is understood to mean a compound which has at least one $PO_4$ group in the molecule. Examples of phosphates which can be used in accordance with the invention are alkyl ether phosphates—e.g. Maphos® 37P, Maphos® 54P, Maphos® 37T, Maphos® 210T and Maphos® 210P, phosphates such as Lutensit A-EP, alkyl phosphates.

The anionic surfactants are added in the course of preparation of the chemical composition preferably in the form of salts. Suitable salts are, for example, alkali metal salts, such as sodium, potassium and lithium salts, and ammonium salts, such as hydroxyethylammonium, di(hydroxyethyl)ammonium and tri(hydroxyethyl)ammonium salts.

A "quaternary ammonium compound" is understood to mean a compound which has at least one $R_4N^+$ group in the molecule. Examples of quaternary ammonium compounds which can be used in accordance with the invention are halides, methosulfates, sulfates and carbonates of coco-, tallow- or cetyl/oleyltrimethylammonium.

Particularly suitable cationic surfactants include:

$C_7$-$C_{25}$-alkylamines;

N,N-dimethyl-N-(hydroxy-$C_7$-$C_{25}$-alkyl)ammonium salts;

mono- and di($C_7$-$C_{25}$-alkyl)dimethylammonium compounds quaternized with alkylating agents;

ester quats, especially quaternary esterified mono-, di- and trialkanolamines esterified with $C_5$-$C_{22}$-carboxylic acids;

imidazoline quats, especially 1-alkylimidazolinium salts of the formula II or III in which the variables are each defined as follows:

$R^9$ $C_1$-$C_{25}$-alkyl or $C_2$-$C_{25}$-alkenyl;

$R^{10}$ $C_1$-$C_4$-alkyl or hydroxy-$C_1$-$C_4$-alkyl;

$R^{11}$ $C_1$-$C_4$-alkyl, hydroxy-$C_1$-$C_4$-alkyl or an $R^1$—(CO)—X—(CH$_2$)$_m$— radical (X: —O— or —NH—; m: 2 or 3), where at least one $R^9$ radical is $C_7$-$C_{22}$-alkyl.

Moreover, a "betaine surfactant" is understood to mean a compound which, under application conditions, i.e., for example in the case of textile laundry, under standard pressure and at temperatures from room temperature to 95° C., each bear at least one positive and one negative charge. An "alkyl betaine" is a betaine surfactant which has at least one alkyl unit in the molecule. Examples of betaine surfactants which can be used in accordance with the invention are cocamidopropylbetaine—e.g. MAFO® CAB, Amonyl® 380 BA, AMPHOSOL® CA, AMPHOSOL® CG, AMPHOSOL® CR, AMPHOSOL® HCG; AMPHOSOL® HCG-50, Chembetaine® C, Chembetaine® CGF, Chembetaine® CL, Dehyton® PK, Dehyton®PK 45, Emery® 6744, Empigen® BS/F, Empigen® BS/FA, Empigen® BS/P, Genagen® CAB, Lonzaine® C, Lonzaine® CO, Mirataine® BET-C-30, Mirataine® CB, Monateric® CAB, Naxaine® C, Naxaine® CO, Norfox® CAPB, Norfox® Coco Betaine, Ralufon® 414, TEGO®-Betain CKD, TEGO® Betain EKE 1, TEGO®-Betain F, TEGO®-Betain F 50 and amine oxides, for example alkyldimethylamine oxides, i.e. compounds of the general formula (IV)

(IV)

in which $R^1$, $R^2$ and $R^3$ are each independently an aliphatic, cyclic or tertiary alkyl or amidoalkyl radical, for example Mazox® LDA, Genaminox®, Aromox® 14 DW 970.

Nonionic surfactants are interface-active substances with an uncharged, polar, hydrophilic, water-solubilizing head group which does not bear any ionic charge in the neutral pH range (in contrast to anionic and cationic surfactants), said head group being adsorbed at interfaces and aggregating above the micelle formation concentration (cmc) to form neutral micelles. According to the type of hydrophilic head group, a distinction can be drawn between (oligo)oxyalkylene groups, especially (oligo)oxyethylene groups (polyethylene glycol groups), which include the fatty alcohol polyglycol ethers (fatty alcohol alkoxylates), alkylphenol polyglycol ethers and fatty acid ethoxylates, alkoxylated triglycerides and mixed ethers (dialkylated polyethylene glycol ethers); and carbohydrate groups, which include, for example, the alkylpolyglucosides and fatty acid N-methylglucamides.

Alcohol alkoxylates are based on a hydrophobic moiety with a chain length of 4 to 20 carbon atoms, preferably 6 to 19 carbon atoms and more preferably 8 to 18 carbon atoms, where the alcohol may be branched or unbranched, and a hydrophilic moiety, which may comprise alkoxylated units, e.g. ethylene oxide (EO), propylene oxide (PO) and/or butylene oxide (BuO), with 2 to 30 repeat units. Examples include Lutensol® XP, Lutensol® XL, Lutensol® ON, Lutensol® AT, Lutensol® A, Lutensol® AO, Lutensol® TO.

Alcoholphenol alkoxylates are compounds of the general formula (V)

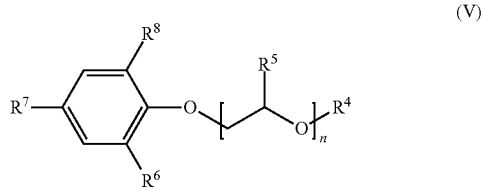

(V)

which are prepared by adding alkylene oxide, preferably ethylene oxide, onto alkylphenols.

In this structure, $R^6$ and $R^8$ are different or preferably the same and are selected from alkyl, preferably methyl or ethyl, or especially hydrogen.

$R^7$ is selected from linear or preferably branched alkyl radicals, unsubstituted or substituted, especially from $C_1$-$C_{20}$-alkyl radicals.

Preferably, $R^4$=H. It is also preferred when $R^5$=H— and the monomer is thus EO; it is equally preferred when $R^5$=$CH_3$, and the monomer is thus PO, or when $R^5$=$CH_2CH_3$ and the monomer is thus BuO.

Particular preference is also given to a compound in which octyl-[($R^1$=$R^3$=H, $R^2$=1,1,3,3-tetramethylbutyl (diisobutylene)], nonyl-[($R^1$=$R^3$=H, $R^2$=1,3,5-trimethylhexyl (tripropylene)], dodecyl-, dinonyl- or tributylphenol polyglycol ethers (e.g. EO, PO, BuO), $R^7$—$C_6H_4$—O-(EO/PO/BuO)n where $R^7$=$C_8$ to $C_{12}$ and n=5 to 10, are present. Nonexclusive examples of such compounds are: Norfox® OP-102, Surfonic® OP-120, T-Det® O-12.

Fatty acid ethoxylates are fatty acid esters aftertreated with different amounts of ethylene oxide (EO).

Triglycerides are esters of glycerol (glycerides) in which all three hydroxyl groups are esterified with fatty acids. They can be modified with alkylene oxide.

Fatty acid alkanolamides are compounds of the general formula (VI)

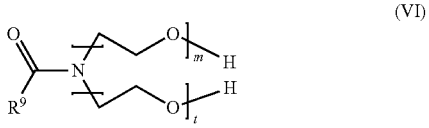

(VI)

which have at least one amide group with an alkyl radical $R^9$ and one or two alkoxy radical(s) where $R^9$ comprises 11 to 17 carbon atoms and 1≤m+t≤5.

Alkyl polyglycosides are mixtures of alkyl monoglucoside (alkyl α-D- and β-D-glucopyranoside and small amounts of -glucofuranoside), alkyl diglucosides (isomaltosides, maltosides and others) and alkyl oligoglucosides (maltotriosides, tetraosides and others). Alkyl polyglycosides are obtainable, among other methods, by acid-catalyzed reaction (Fischer reaction) from glucose (or starch) or from n-butylglucosides with fatty alcohols. Alkylpolyglycosides correspond to the general formula (VII)

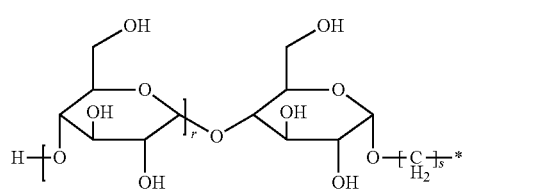

(VII)

in which
r=0 to 3 and
s=4 to 20.

One example is Lutensol® GD70.

In the group of nonionic N-alkylated, preferably N-methylated, fatty acid amides of the general formula (VIII)

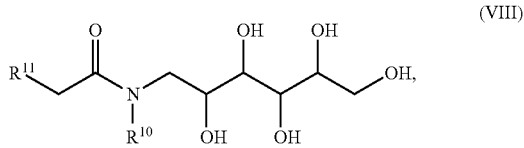

$R^{10}$ is an n-$C_{12}$-alkyl radical, $R^{11}$ is an alkyl radical having 1 to 8 carbon atoms. $R^{11}$ is preferably methyl.

A composition as described, which also comprises at least one disinfectant, is particularly preferred. The at least one disinfectant is present in the composition in a (total) amount of 0.1 to 20% by mass, preferably of 1 to 10% by mass.

Disinfectants may be: oxidizing agents, halogens such as chlorine and iodine and substances which release them, alcohols such as ethanol, 1-propanol and 2-propanol, aldehydes, phenols, ethylene oxide, chlorhexidine and mecetronium metilsulfate.

The advantage of the use of disinfectants is that pathogens can barely spread on the treated surface. Pathogens may be: bacteria, spores, fungi and viruses.

Dyes may include: Acid Blue 9, Acid Yellow 3, Acid Yellow 23, Acid Yellow 73, Pigment Yellow 101, Acid Green 1, Acid Green 25.

Preference is given to a composition in which the at least one dye is present in a (total) amount of 0.1 to 20% by mass, more preferably of 1 to 10% by mass.

Acids are compounds which are used advantageously, for example, for dissolution of or for prevention of scale deposits. Examples of acids are formic acid, acetic acid, citric acid, hydrochloric acid, sulfuric acid and sulfonic acid.

Bases are compounds which can be used advantageously for the setting of the favorable pH range for complexing agents. Examples of bases which can be used in accordance with the invention are: NaOH, KOH and aminoethanol.

Suitable inorganic builders are especially:
crystalline and amorphous aluminosilicates with ion-exchanging properties, such as zeolites in particular: various types of zeolites are suitable, especially zeolites A, X, B, P, MAP and HS in their sodium form, or in forms in which sodium has been exchanged partly for other cations, such as Li, K, Ca, Mg or ammonium;
crystalline silicates, such as disilicates and sheet silicates in particular, e.g. δ- and β-$Na_2Si_2O_5$. The silicates can be used in the form of their alkali metal, alkaline earth metal or ammonium salts, preference being given to the sodium, lithium and magnesium silicates;
amorphous silicates, such as sodium metasilicate and amorphous disilicate;
carbonates and hydrogencarbonates: these can be used in the form of their alkali metal, alkaline earth metal or ammonium salts. Preference is given to sodium, lithium and magnesium carbonates and hydrogencarbonates, especially sodium carbonate and/or sodium hydrogencarbonate; and
polyphosphates, such as pentasodium triphosphate.

Suitable oligomeric and polymeric cobuilders are:
oligomeric and polymeric carboxylic acids, such as homopolymers of acrylic acid and aspartic acid, oligomaleic acids, copolymers of maleic acid with acrylic acid, methacrylic acid or $C_2$-$C_{22}$-olefins, e.g. isobutene or long-chain α-olefins, vinyl $C_1$-$C_8$-alkyl ethers, vinyl acetate, vinyl propionate, (meth)acrylic esters of $C_1$-$C_8$-alcohols and styrene.

Preference is given to the homopolymers of acrylic acid and copolymers of acrylic acid with maleic acid. The oligomeric and polymeric carboxylic acids are used in acid form or as the sodium salt.

Complexing agents are compounds which are capable of binding cations. This can be utilized in order to reduce the hardness of water and to precipitate troublesome heavy metal ions. Examples of complexing agents are NTA, EDTA, MGDA, DTPA, DTPMP, IDS, HEDP, β-ADA, GLDA, citric acid, oxodisuccinic acid and butanetetracarboxylic acid. The advantage of the use of these compounds is that many cleaning-active compounds achieve better action in soft water; moreover, reducing the water hardness can prevent the occurrence of scale deposits after the cleaning. Use of these compounds thus eliminates the need to dry a cleaned surface. This is advantageous in terms of work sequence and is desirable especially because the inventive composition applied for preservation is not partly removed again in this way. In the case of treatment of textiles, the fibers remain more mobile, such that they have a better feel when worn.

Suitable graying inhibitors are, for example, carboxymethylcellulose and graft polymers of vinyl acetate onto polyethylene glycol.

Suitable bleaches are, for example, adducts of hydrogen peroxide onto inorganic salts, such as sodium perborate monohydrate, sodium perborate tetrahydrate and sodium carbonate perhydrate, and percarboxylic acids such as phthalimidopercaproic acid.

Suitable bleach activators are, for example, N,N,N',N'-tetraacetylethylenediamine (TAED), sodium p-nonanoyloxybenzenesulfonate and N-methylmorpholinioacetonitrilomethyl sulfate.

Suitable enzymes are, for example, proteases, lipases, amylases, cellulases, mannanases, oxidases and peroxidases.

Suitable dye transfer inhibitors are, for example, homopolymers, copolymers and graft polymers of 1-vinylpyrrolidone, 1-vinylimidazole or 4-vinylpyridine N-oxide. Homo- and copolymers of 4-vinylpyridine which have been reacted with chloroacetic acid are also suitable as dye transfer inhibitors.

Biocides are compounds which kill bacteria. One example of a biocide is glutaraldehyde. The advantage of the use of biocides is that they counteract the spread of pathogens.

Hydrotropes are compounds which improve the solubility of the surfactant/of the surfactants in the chemical composition. One example of a hydrotrope is cumenesulfonate.

Thickeners are compounds which increase the viscosity of the chemical composition. Nonlimiting examples of thickeners are: polyacrylates and hydrophobically modified polyacrylates. The advantage of the use of thickeners is that liquids with higher viscosities have a longer residence time on tilted or vertical surfaces than liquids with lower viscosity. This increases the interaction between composition and surface to be cleaned.

The use of the inventive microcapsules for production of the inventive chemical composition forms a further part of the subject matter of the invention.

The present invention further provides for the use of inventive microcapsules for treatment of surfaces. Preference is given to a use in which the surface to be treated is selected from the group consisting of fibers, nonwovens, foams, flags, tiles, marble, ceramic, concrete, plastic, metal, enamel, glass. Particular preference is given to a use in which the article to be treated is a textile, i.e. to a use in a washing composition or in a fabric softener.

Therefore, the use of inventive microcapsules and especially the use of a chemical composition comprising inventive microcapsules in textile laundry also forms a particularly preferred part of the subject matter of the present invention.

The present invention further provides an article which comprises inventive microcapsules and is preferably an article which has the inventive microcapsules on its surface.

A suitable article is any body for which it is desired that it gives off a particular odor on contact, i.e. in the case of pressurization. Nonlimiting examples are: packaging material of all kinds such as cardboard, film, adhesive, adhesive labels, cleaning cloths, nonwovens, leather products, paints and coating materials, cosmetic products, all kinds of vessels, especially those which contain foods or cosmetics, glass, plastics parts, automobiles, etc.

The invention is described further hereinafter by examples:
Figures in % are percentages by weight, unless explicitly stated otherwise.

EXAMPLES

For the production of the microcapsules, the following substances were used:
Oil:
mineral oil hydrogenated under high pressure, with a viscosity of approx. 68 mm$^2$/s at 40° C. and a solidification point of −21° C. (white oil).
Odorant:
(constituents each in % by weight)
Odorant A
Early Release Constituents [% by Weight]:
beta-pinene 0.09 citronellol 2.54 citronellyl acetate 1.04 decylaldehyde 2.00 delta-damascone 0.10 dihydromyrcenol 6.75 geranylnitrile 9.29 d-limonene 22.90 lorysia 0.74 lymolene 9.73 methylnonylacetaldehyde 2.07 paracymene 0.17 terpineolene 11.44 Verdox 3.38
Retarded Release Constituents:
allyl amyl glycolate 0.14 alpha-terpineol 0.38 anisaldehyde 0.18 ethyl butyrate 0.01 ethyl 2-methylbutyrate 0.26 ethyl 2-methylpentanoate 0.34 eucalyptol 1.36 flor acetate 1.81 frutene 1.30 geraniol 6.33 ligustral 2.16 linalool 1.03 methyl grapefruit 1.48 octylaldehyde 1.43 prenyl acetate 0.46 Triplal 0.14
Base Masking Constituents:
citrathal 1.18 habanolide 100% 0.74 beta-ionone 0.37 Iso E Super 0.74 neobutenone 0.03
Further Constituent:
methyl dihydrojasmonate 5.89
Odorant B:
Early Release Constituents:
beta-pinene 0.08 citronellyl acetate 3.97 decylaldehyde 1.75 delta-damascone 0.39 geranylnitrile 4.12 d-limonene 17.70 lorysia 1.40 lymolene 8.50 paracymene 0.15 terpineolene 10.00 tetrahydrolinalool 13.52
Retarded Release Constituents:
allyl amyl glycolate 0.12 allyl caproate 1.59 ethyl 2-methylbutyrate 5.57 eucalyptol 0.63 flor acetate 2.11 frutene 2.11 geraniol 2.70 ligustral 4.05 linalool 0.90 methyl grapefruit 1.31 octylaldehyde 1.25 phenylethyl alcohol 0.45 prenyl acetate 0.40 Violiff 0.79
Base Masking Constituents:
citrathal 0.38 clonal 0.16 cyclabut 1.59 florhydral 0.08 nectaryl 2.39 neobutenone 0.16
Further Constituent:
methyl dihydrojasmonate 9.68
Odorant C:
limonene 100
Odorant D:
citronellal 100
Protective Colloids:
Protective colloid 1: methylhydroxypropylcellulose (with a Brookfield viscosity (at 20° C., 20 rpm, 2%) of 90-125 mPas), 5% by weight solution in water.
Protective colloid 2: polyvinyl alcohol solution: 10% by weight in water, degree of hydrolysis 79%, mean degree of polymerization PW: 1900
Monomer Abbreviations:
MMA methyl methacrylate
MAA methacrylic acid
BDA2 1,4-butanediol diacrylate
PETIA pentaerythrityl triacrylate
EDGMA ethylene glycol dimethacrylate
DMAEMA N,N-dimethylaminoethyl methacrylate Example 1

Corresponds to Process 1

EGDMA
40/20/40 MMA/MAA/EDGMA white oil
First, the water phase and the oil phase were produced separately with the following composition:
Water Phase:
207.0 g water
120.33 g protective colloid 1
60.20 g protective colloid 2
1.12 g of a 2.5% by weight aqueous sodium nitrite solution
Oil Phase:
144 g odorant A
96 g oil
24.0 g methyl methacrylate
12.0 g methacrylic acid
24.55 g 98% by weight aqueous EGDMA solution
1.20 g tert-butyl perneodecanoate
Feed 1:
3.6 g of a 10% by weight aqueous tert-butyl hydroperoxide solution in hydrocarbons
Feed 2:
16.25 g of a 2% aqueous ascorbic acid solution
The water phase was initially charged at room temperature. Addition of the oil phase was followed by dispersion with a dissolver stirrer at 3500 rpm for 40 minutes. The emulsion formed was heated to 50° C. while stirring with an anchor stirrer within 60 minutes, and to 75° C. within a further 60 minutes, and kept at 75° C. for two hours. Feed 1 was added to the microcapsule dispersion formed while stirring. Feed 2 was metered in within 50 minutes, in the course of which the mixture was cooled to room temperature within 60 minutes. The microcapsule dispersion formed possessed a solids content of 44.9% and a mean particle size of 2.13 μm (measured by Fraunhofer diffraction, volume average).

Example 2

Corresponds to Process 2

PETIA
30/40/30 MMA/PETIA/MAA white oil
First, the water phase and the oil phase were produced separately with the following composition:
Water Phase:
271.62 g water
82.19 g protective colloid 1

20.55 g protective colloid 2
0.91 g of a 2.5% by weight aqueous sodium nitrite solution
Oil Phase:
120 g odorant A
70.28 g oil
14.31 g MMA
19.09 g PETEA
14.31 g MM
0.95 g tert-butyl perneodecanoate
Feed 1:
2.33 g of a 10% by weight aqueous tert-butyl hydroperoxide solution
Feed 2:
12.24 g of a 1% aqueous ascorbic acid solution The water phase was initially charged at room temperature. Addition of the oil phase was followed by dispersion with a dissolver stirrer at 3500 rpm for 40 minutes. The emulsion formed was heated to 70° C. while stirring with an anchor stirrer within 60 minutes, and to 85° C. within a further 60 minutes, and kept at 85° C. for two hours. Feed 1 was added to the microcapsule dispersion formed while stirring. Feed 2 was metered in within 50 minutes, in the course of which the mixture was cooled to room temperature within 60 minutes. The microcapsule dispersion formed possessed a solids content of 40.7% and a [0.9] particle size of 2.9 μm (measured by Fraunhofer diffraction, volume average).

Examples X1 and X2 illustrate the present invention in the production of microcapsules with relatively high odorant loading according to processes 1 and 2 respectively. In these examples the proportion by mass of the oil phase was kept constant and consisted solely of odorant and monomers. The amount of solvent was replaced by the amount of odorant, which increases the loading of the microcapsules with odorant. This enables the concentration of the odorant to be adjusted. This method of altering the odorant loading can be used for various kinds of capsule walls.

Examples 3 to 15 while stirring. The fabric softener formulation was produced in case A) with the free fragrance mixture, and in case B) with the fragrance mixture encapsulated in accordance with the invention from example 11.

The fabric softener formulations thus produced were subsequently tested in a washing machine (Miele) (3.5 kg of hand towels, cotton, prewashed with a liquid washing composition, unperfumed, at 40° C., 16° dH, addition in the post-rinse cycle of fabric softener formulation A or B in an amount of 50 ml, drying in a vented dryer from Miele with the "cupboard-dry" setting).

Analysis of the Release Behavior:

The fragrance impression on at least 5 hand towels was assessed sensorily before and after rubbing with the hands (cf. rating scale). The mean formed therefrom is reported. The assessment was repeated each time after storage for 1 week/2 weeks/4 weeks.

Definition of the Evaluation Scale:
Number Assessment
1 Very low odor perception
2 Distinct odor perception
3 Strong odor perception
Before the Rubbing Experiment
1 week/2 weeks/4 weeks
A) 1/1/1
B) 2/2/1
After the Rubbing Experiment
1 week/2 weeks/4 weeks
A) 1/1/1
B) 3/2/2

It is clearly evident that the inventive product has improved fragrance release in the course of prolonged storage time and as a result of mechanical stress.

Example 17

Production and Performance Testing of a Liquid Washing Composition 100 g of a nonionic surfactant ($C_{13}$-$C_{15}$ alcohol, ethoxylated with 7 EO) are initially charged and heated to 50° C.

| Example No. | Process No. | Solids content theor. % by wt. | found % by wt. | Active constituent Solids content (theor.)/% | Odorant | Monomer (shell) % by wt. | | | | | Particle diameter [μm] D [V0.9] | Results of the evaporation rate test [%] |
|---|---|---|---|---|---|---|---|---|---|---|---|---|
| | | | | | | MMA | BDA2 | PETIA | EGDMA | MAA | | |
| 3 | 2 | 40 | 40.4 | 50 | odorant A | 40 | | 30 | 10 | 20 | 3.66 | 3.5 |
| 4 | 2 | 40 | 40.1 | 50 | odorant A | 30 | | 30 | | 40 | 3.54 | 1.4 |
| 2 | 2 | 40 | 40.66 | 50 | odorant B | 30 | | 40 | | 30 | 2.9 | 2.4 |
| X2 | 2 | 40 | 38.2 | 78.3 | odorant A | 30 | | 40 | | 30 | 3.52 | 4.1 |
| 5 | 2 | 40 | 41.25 | 50 | odorant B | 30 | | 30 | | 40 | 4.12 | 1.4 |
| 6 | 2 | 40 | 41.42 | 50 | odorant B | 40 | 30 | | | 30 | 5.92 | 1.6 |
| 7 | 2 | 40 | 39.9 | 50 | odorant B | 40 | 10 | 30 | | 20 | 3.38 | 1.7 |
| 1 | 1 | 43.3 | 42.8 | 45.8 | odorant C | 40 | | | 40 | 20 | 2.86 | 3.9 |
| 8 | 1 | 44 | 42.5 | 45.8 | odorant C | 40 | | | 30 | 30 | 2.79 | 1.9 |
| X1 | 1 | 44.6 | 42.3 | 76.2 | odorant C | 40 | | | 30 | 30 | 2.91 | 5.2 |
| 9 | 1 | 45 | 44.9 | 45.8 | odorant C | 50 | | | 30 | 20 | 2.88 | 1.3 |
| 10 | 2 | 40 | 40.6 | 50 | odorant D | 30 | 30 | | | 40 | 3.8 | 0.3 |
| 11 | 2 | 40 | 39.95 | 50 | odorant D | 30 | 40 | | | 30 | 2.91 | 1.16 |

Example 16

Production and Performance Testing of Fabric Softener

Distearyldimethylammonium chloride (active content 75%) was first diluted to active content 7% at 45° C., cooled to 25° C. and then admixed with 0.6% of the odorant (active content)

Subsequently, 80 g of 1,2-propanediol, 85 g of a coconut oil fatty acid and 44 g of potassium hydroxide are stirred in successively. The overall mixture is then admixed with 507 g of water heated to 45° C. In addition, 134 g of an alkylbenzenesulfonic acid and 30 g of sodium citrate were then stirred in. After cooling to room temperature, 20 g of ethanol are also added to the mixture. In case C) 4.5 g of a free fragrance mixture are stirred into this liquid washing composition formulation, and in case D) 4.5 g of an encapsulated fragrance mixture (active content).

The liquid washing composition formulations thus produced were subsequently tested in a washing machine (Miele) (3.5 kg of hand towels, cotton, at 40° C., 16° dH, without after-rinse, 95 ml of formulation C) or D), drying in a vented dryer from Miele with the "cupboard-dry" setting).

Analysis of the Release Behavior:

The fragrance impression on at least 5 hand towels was assessed sensorily before and after rubbing with the hands (cf. rating scale). The mean formed therefrom is reported.

Before the Rubbing Experiment
1 week/2 weeks/4 weeks
A) 1/1/1
B) 2/1/1
After the Rubbing Experiment
1 week/2 weeks/4 weeks
A) 1/1/1
B) 2/2/2

It is clearly evident that the inventive product has improved fragrance release in the course of prolonged storage time and as a result of mechanical stress.

The invention claimed is:

1. A microcapsule comprising a core a) which comprises a fragrance or odorant, and a shell b), b) being obtained by polymerizing one or more $C_1$-$C_{24}$-alkyl ester(s) of acrylic acid or methacrylic acid, MAA, and one or more compound selected from the group consisting of BDA2, PETIA and EDGMA, wherein the shell comprises 20 to 60% by mass of MAA in copolymerized form; wherein BDA2, PETIA, or EDGMA, if present, is present in an amount of 10 to 50% by mass in copolymerized form; and
  wherein the total amount of BDA2, PETIA and EDGMA in the shell in copolymerized form is at least 30% by mass;
  wherein the fragrance or odorant is selected from the group consisting of 7-acetyl-1,2,3,4,5,6,7,8-octahydro-1,1,6, 7-tetramethylnaphthalene, α-ionone, β-ionone, γ-ionone, α-isomethylionone, methyl cedryl ketone, methyl dihydrojasmonate, methyl 1,6,10-trimethyl-2,5,9-cyclododecatrien-1-yl ketone, 7-acetyl-1,1,3,4,4,6-hexamethyl-tetralin, 4-acetyl-6-tert-butyl-1,1-dimethylindane, hydroxyphenylbutanone, benzophenone, methyl β-naphthyl ketone, 6-acetyl-1,1,2,3,3,5-hexamethylindane, 5-acetyl-3-isopropyl-1,1,2,6-tetramethylindane, 1-dodecanal, 4-(4-hydroxy-4-methylpentyl)-3-cyclohexene-1-carboxaldehyde, 7-hydroxy-3,7-dimethyloctanal, 10-undecen-1-al, isohexenylcyclohexylcarboxaldehyde, formyltricyclodecane, condensation products of hydroxycitronellal and methyl anthranilate, condensation products of hydroxycitronellal and indole, condensation products of phenylacetaldehyde and indole, 2-methyl-3-(para-tert-butyl-phenyl)propionaldehyde, ethylvanillin, heliotropin, hexylcinnamaldehyde, amylcinnamaldehyde, 2-methyl-2-(iso-propylphenyl)propionaldehyde, coumarin, decalactone-γ, cyclopentadecanolide, 16-hydroxy-9-hexadecenolactone, 1,3,4,6,7, 8-hexahydro-4,6,6,7,8,8-hexamethylcyclopenta-γ-2-benzopyran, β-naphthol methyl ether, ambroxan, dodecahydro-3a,6,6,9a-tetramethylnaphtho[2,1b]furan, cedrol, 5-(2,2,3-trimethylcyclopent-3-enyl)-3-methylpentan-2-ol, 2-ethyl-4-(2,2,3-trimethyl-3-cyclopenten-1-yl)-2-buten-1-ol, caryophyllene alcohol, tricyclodecenyl propionate, tricyclodecenyl acetate, benzyl salicylate, cedrol acetate, and tert-butylcyclohexyl acetate.

2. The microcapsule according to claim 1, wherein the shell b) wherein the shell comprises
  MAA in an amount of 25 to 50% by mass, and wherein BDA2, PETIA, or EDGMA, if present, is present in an amount of 20 to 40% by mass in copolymerized form.

3. The microcapsule according to claim 1, in which the $C_1$-$C_{24}$-alkyl ester of acrylic acid or methacrylic acid is methyl methacrylate, wherein the shell comprises
  MAA in an amount of 35 to 45% by mass, and wherein BDA2, PETIA, or EDGMA, if present, is present in an amount of 25 to 35% by mass.

4. The microcapsule according to claim 1, wherein the microcapsule has an evaporation rate, measured by the "evaporation rate test", of less than 10% by mass.

5. The microcapsule according to claim 1, in which the mean diameter of the microcapsule is in the range from 0.8 to 100 μm.

6. The microcapsule according to claim 1, in which the ratio of the thickness of the shell to the diameter of the microcapsule is in the range of from 0.005 to 0.1.

7. A chemical composition comprising microcapsules according to claim 1.

8. The chemical composition according to claim 7, further comprising at least one substance selected from the group consisting of surfactants, disinfectants, dyes, acids, bases, complexing agents, biocides, hydrotropes, thickeners, builders, cobuilders, enzymes, bleaches, bleach activators, corrosion inhibitors, bleach catalysts, color protection additives, dye transfer inhibitors, graying inhibitors, soil release polymers, fiber protection additives, silicones, bactericides and preservatives, organic solvents, solubilizers, dissolution improvers, and perfume.

9. A washing composition or fabric softener for treating a textile comprising the chemical composition according to claim 7.

10. The microcapsule according to claim 1, wherein the microcapsule enables retarded release of the fragrance or odorant.

11. A method comprising treating surfaces with the microcapsule of claim 1.

12. A washing composition or fabric softener for treating a textile comprising the microcapsule according to claim 1.

13. An article comprising a microcapsule according to claim 1.

14. The article according to claim 13, wherein the microcapsule is on the surface of the article.

15. A microcapsule comprising a core a) which comprises a fragrance or odorant and a shell b), wherein the shell b) is obtained by polymerizing one or more $C_1$-$C_{24}$-alkyl ester of acrylic acid or methacrylic acid and PETIA in an amount of 20 to 50% by mass, MAA in an amount of 25 to 60% by mass, and optionally one or more compound selected from the group consisting of:
  BDA2 in an amount of 20 to 40% by mass, and
  EDGMA in an amount of 20 to 40% by mass;
wherein the one or more $C_1$-$C_{24}$-alkyl ester of acrylic acid or methacrylic acid and the PETIA and the optional one or more compound are present in the shell in copolymerized form; and wherein the total amount of BDA2, PETIA and EDGMA in the shell in copolymerized form is at least 30% by mass.

16. The microcapsule according to claim 15, wherein the PETIA is present in an amount of 20 to 40% by mass and the MAA is present in an amount of 25 to 50% by mass.

17. A microcapsule comprising a core a) which comprises a fragrance or odorant, and a shell b), b) being obtained by polymerizing one or more $C_1$-$C_{24}$-alkyl esters of acrylic acid, MAA, PETIA, and optionally EDGMA; wherein the shell comprises 20 to 60% by mass MAA; wherein PETIA is present in an amount of 10 to 50% by weight; and wherein the total amount of PETIA and EDGMA present in the shell in copolymerized form is at least 30% by mass.

* * * * *